US006861815B2

(12) United States Patent
Cho et al.

(10) Patent No.: US 6,861,815 B2
(45) Date of Patent: Mar. 1, 2005

(54) MOTOR CONTROL DRIVE CIRCUIT

(75) Inventors: Hyun-Min Cho, Seoul (KR); Yong-Bae Park, Kyungki-do (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 37 days.

(21) Appl. No.: 10/229,612

(22) Filed: Aug. 27, 2002

(65) Prior Publication Data

US 2003/0071595 A1 Apr. 17, 2003

(30) Foreign Application Priority Data

Oct. 11, 2001 (KR) ......................................... 2001-62617

(51) Int. Cl.[7] .......................... G05B 11/28; H02P 5/28; H02P 7/29
(52) U.S. Cl. ...................... 318/599; 318/810; 318/811; 388/829; 341/152
(58) Field of Search ................................ 388/811, 819, 388/829, 831, 804; 341/152, 139, 140; 318/801, 811, 599

(56) References Cited

U.S. PATENT DOCUMENTS

| | | | | |
|---|---|---|---|---|
| 3,597,693 A | * | 8/1971 | McNeilly | 341/152 |
| 4,139,811 A | * | 2/1979 | Klinger | 318/615 |
| 4,622,500 A | * | 11/1986 | Budelman, Jr. | 388/811 |
| 4,680,516 A | * | 7/1987 | Guzik et al. | 388/812 |
| 4,977,360 A | * | 12/1990 | Leleve | 318/596 |
| 5,268,987 A | * | 12/1993 | Sakoh | 388/819 |
| 5,361,025 A | * | 11/1994 | De Filippis et al. | 318/599 |
| 5,559,414 A | * | 9/1996 | Minabe et al. | 318/606 |
| 5,687,277 A | * | 11/1997 | Matsuzaki et al. | 388/804 |
| 5,801,504 A | * | 9/1998 | Endo et al. | 318/434 |
| 6,307,336 B1 | * | 10/2001 | Goff et al. | 318/254 |
| 6,441,578 B1 | * | 8/2002 | Mir et al. | 318/599 |
| 6,509,708 B2 | * | 1/2003 | Cho et al. | 318/599 |
| 6,515,443 B2 | * | 2/2003 | Kelly et al. | 318/599 |
| 6,563,283 B2 | * | 5/2003 | Iwashita et al. | 318/599 |
| 6,657,572 B2 | * | 12/2003 | Lee et al. | 341/143 |
| 6,768,779 B1 | * | 7/2004 | Nielsen | 375/297 |

FOREIGN PATENT DOCUMENTS

| | | | | |
|---|---|---|---|---|
| JP | 03007082 A | * | 1/1991 | H02P/5/17 |
| JP | 03215189 A | * | 9/1991 | H02P/7/63 |
| JP | 04121084 A | * | 4/1992 | H02P/5/00 |
| JP | 2001-119972 | | 4/2001 | H02P/5/00 |
| KR | 1002694500000 | | 7/2000 | H02P/5/17 |

* cited by examiner

Primary Examiner—David Martin
Assistant Examiner—Patrick Miller
(74) Attorney, Agent, or Firm—Sidley Austin Brown & Wood LLP

(57) ABSTRACT

Embodiments of present invention may provide a motor control drive circuit for driving a motor by receiving signals from a digital signal control device. The motor control drive circuit includes a switching unit receiving signals that have undergone pulse width modulation (PWM signals) in the digital signal control device, and converting a switching state based on the input signals; and a controller receiving from the switching unit switching operational signals that vary according to a duty ratio of the PWM signals, receiving digital signals from the digital signal control device, and varying a voltage gain for control of the drive motor. In the motor control drive circuit of one embodiment of the present invention, motor rotation is controlled by the duty ratio of digital signals without the use of a DAC. This allows for the design of an independent digital signal processing device, and enables compatibility with various digital signal processing devices.

10 Claims, 3 Drawing Sheets

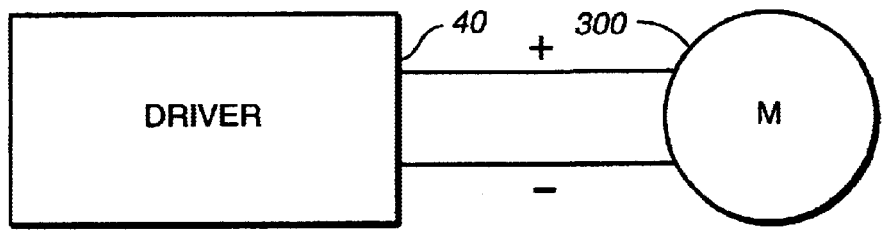
FIG._1
*(PRIOR ART)*
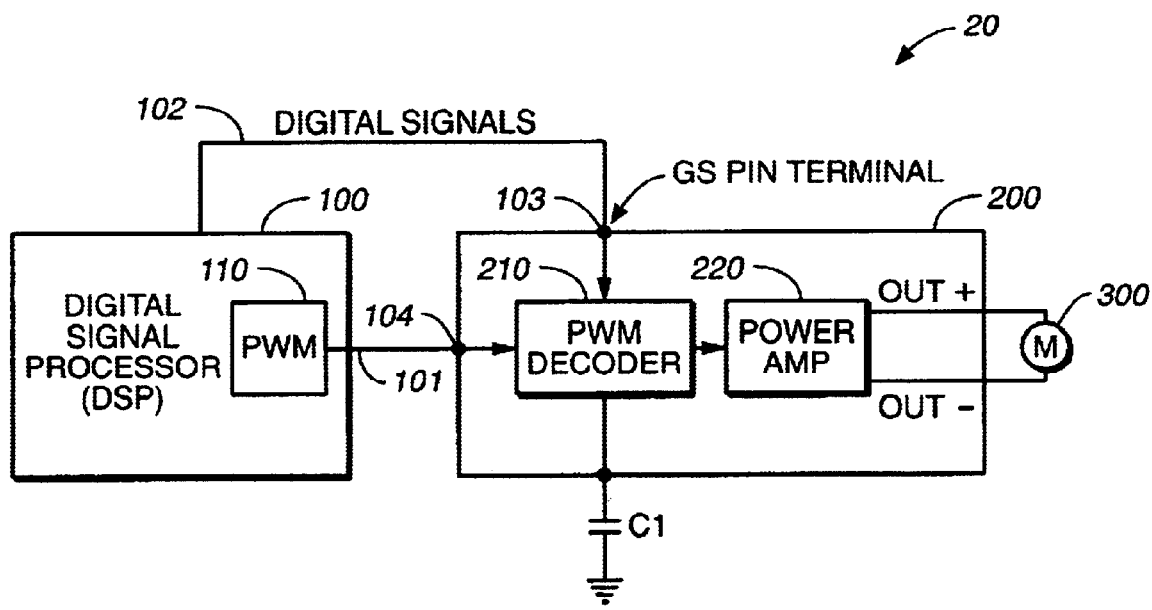
FIG._2

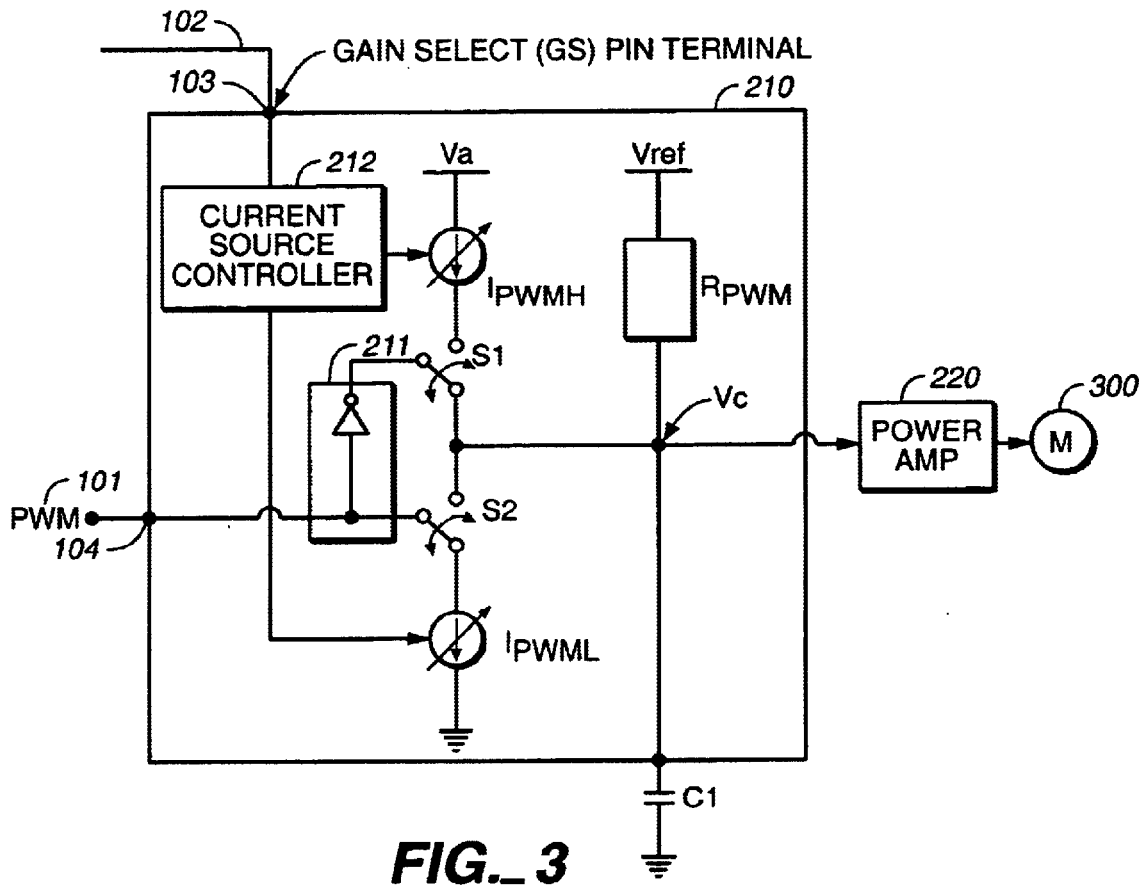
FIG._3
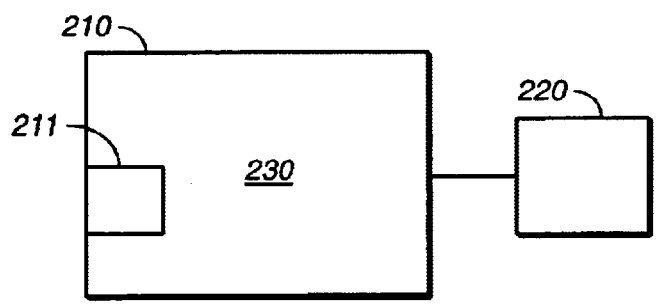
FIG._3A

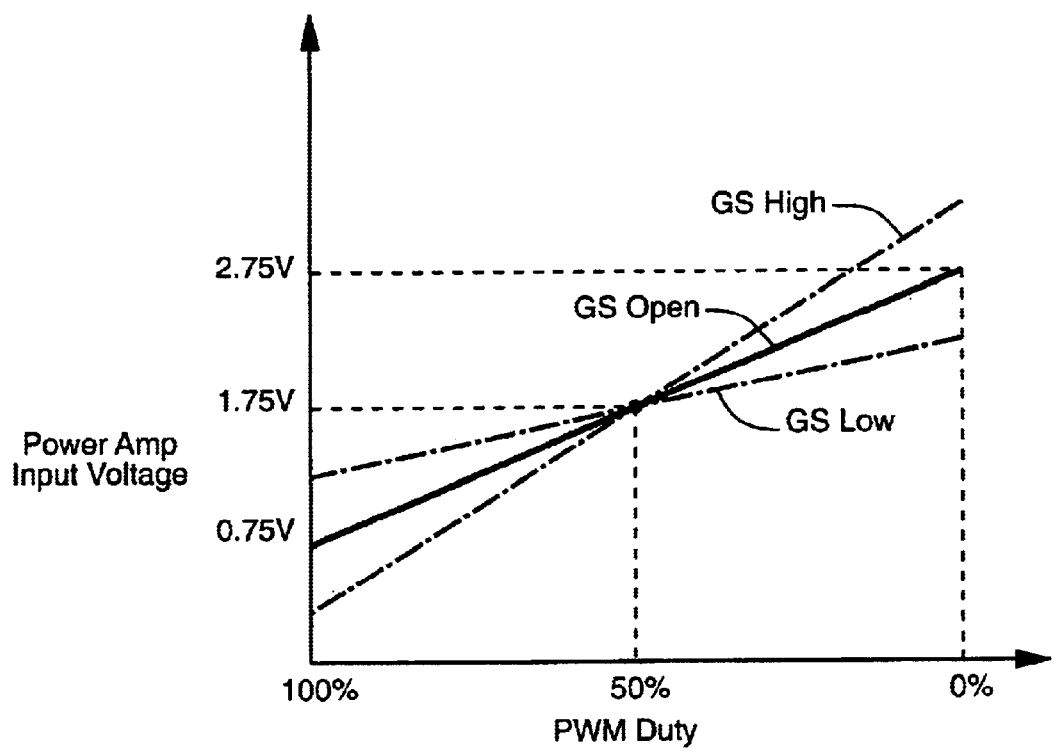
FIG._ 4A
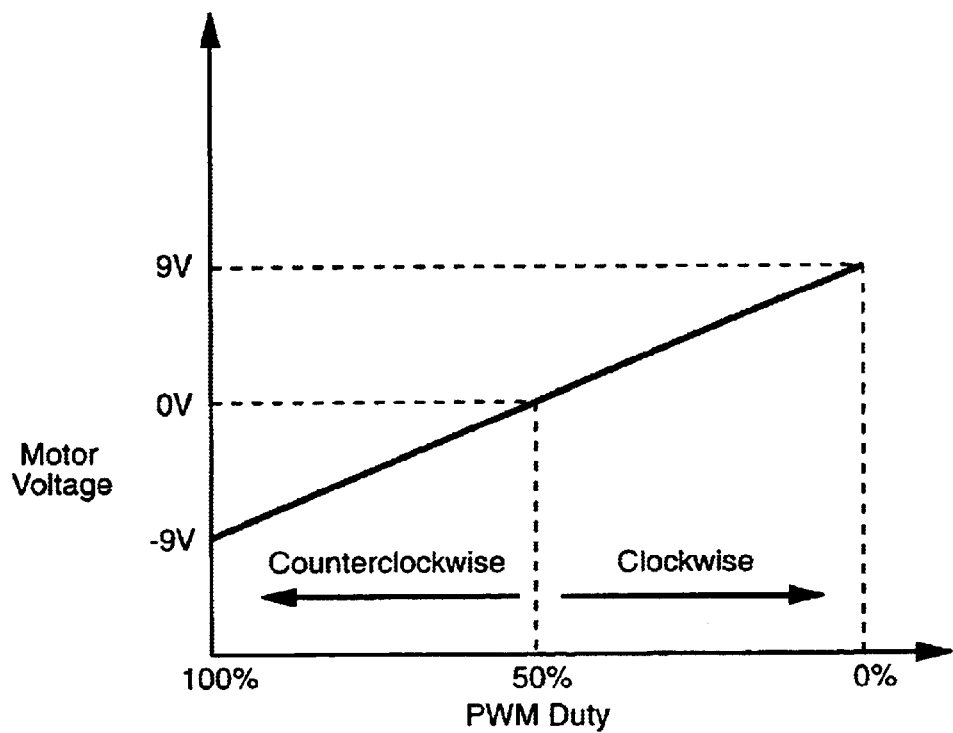
FIG._ 4B

MOTOR CONTROL DRIVE CIRCUIT

RELATED APPLICATION

This application claims priority to South Korean Patent Application number 2001-62617 filed Oct. 11, 2001.

FIELD OF THE INVENTION

The present invention relates to electric motors, and more particularly, to a motor control drive circuit.

BACKGROUND OF THE INVENTION

DC (direct current) motors, and driver circuits to energize them, are well known. DC motors may be deployed for bi-directional operation, for example as a sled motor for an optical pickup in a computer optical disk drive. Usage of DC motors is common and there are many applications for them.

As shown in FIG. 1, using a previously developed driver circuit 40, a DC motor 300 may be energized for rotation in either clockwise or counter-clockwise direction and at various speeds responsive to the polarity and magnitude of the drive current. A BTL (balanced transformerless) circuit may be used. The motor may receive current from a PA (power amplifier) that is preceded in the drive circuit by a scaling circuit and a level-shifting circuit. The scaling circuit may deploy one or more attenuators and/or one or more amplifiers such as OpAmps (operational amplifiers). The level shifting and scaling circuits may be responsive to an analog signal generated by a DAC (digital to analog converter) which may be controlled by or incorporated into a microcontroller such as a DSP (digital signal processor). Typically in such a circuit, the DSP is responsive to a sensor that detects motor rotation or motor position and thus a closed loop control system for the motor may be formed.

In some applications, for example in consumer grade electronic devices, operation over a wide tolerance in input voltage, using cheaper components, and without performance degradation is desirable. In previously developed circuits, it may be necessary to adjust the level shifting circuit or the scaling circuit if it is required to accommodate wide variations in input supply voltage, for example, in a product variant. Alternatively, optimal performance may be compromised by design constraints, such as of multiple product variants.

SUMMARY

In various embodiments, the present invention offers a design capable of providing a superior cost-performance tradeoff across variations in power supply, component tolerance and product application and/or design.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 is a block diagram of a prior art motor and drive circuit;

FIG. 2 is a block diagram of a motor control drive circuit according to an embodiment of the present invention;

FIG. 3 is a schematic diagram, in partial block form, of a PWM decoder according to an embodiment of the present invention.

FIG. 3a is an alternative representation of the PWM decoder of FIG. 3.

FIGS. 4a and 4b are graphs respectively showing circuit input voltages and motor voltages according to embodiments of the present invention.

For convenience in description, identical components have been given the same reference numbers in the various drawings.

DETAILED DESCRIPTION OF THE PREFERRED EMBODIMENTS

In the following description, for purposes of clarity and conciseness of the description, not all of the numerous components shown in the schematics and/or drawings are described. The numerous components are shown in the drawings to provide a person of ordinary skill in the art a thorough, enabling disclosure of the present invention. The operation of many of the components would be understood and apparent to one skilled in the art.

In various embodiments of the invention, circuits and methods are provided for driving DC motors.

In one embodiment, the present invention provides a motor control drive circuit for driving a DC motor by receiving control signals from a digital signal control device that controls rotation of the drive motor. The drive motor converts electrical energy into mechanical energy to perform a specific function. The motor control drive circuit may include a switching unit for receiving signals that have undergone PWM (pulse width modulation) in a digital signal control device and for converting a switching state based on the input signals. The motor control drive circuit may also include a controller that may receive, from the switching unit, switching operational signals that vary according to a duty ratio of signals that have undergone PWM. The controller may also receive digital signals from the digital signal control device, and vary a voltage gain of a signal that may be applied to the drive motor to control the magnitude and direction of rotation of the drive motor.

In another embodiment, the motor control drive circuit may include a digital signal controller outputting signals that have undergone PWM and that have a particular duty ratio. The motor control drive circuit may further include a PWM decoder for receiving operational signals having a particular duty ratio and further receiving, from the digital signal controller, digital signals that may control a gain. The gain may control a voltage applied to the drive motor in response to digital signals that control a rotation of the drive motor according to a PWM duty ratio.

FIG. 2 is a block diagram of a motor control drive circuit 20 according to an embodiment of the present invention. As shown, a motor control drive circuit 20 may include a DSP (digital signal processor) 100 and a motor control driver 200. The DSP 100 may convert analog signals (not shown in FIG. 2) generated in an external circuit (also not shown in FIG. 2) into digital signals 101, 102. The digital signals 101, 102 may be used as control signals for controlling the motor control driver 200 that drives the motor 300. The motor control driver 200 may be responsive to a duty ratio of the digital control signal 101 output from the DSP 100, and also may adjust a gain responsive to the digital control signal 102. A capacitor C1 may be coupled to a terminal of the motor control driver 200 to charge and discharge an electric charge generated by the motor control driver 200.

The DSP 100 may include a MOD (pulse width modulator) 110 for pulse width modulation of input analog signals (not shown in FIG. 2) into digital signals 101.

The motor control driver 200 may include a PWM decoder 210 for receiving digital signal 101 having a duty ratio as modulated by the MOD 110. The motor control driver 200 may generate a voltage that varies according to the duty ratio. The motor control driver 200 may further include a PA (power amplifier) 220 for amplifying by a specific gain signals output by the PWM decoder 210. The motor control driver 200 may also include a GS pin (gain select pin) terminal 103 that receives digital signal 102 from the DSP 100. The motor control driver 200 may also include a terminal 104 that receives PWM digital signal 101 from the DSP 100.

Digital signals 101 and 102 may be tri-state signals each having OPEN, HIGH, and LOW states or conditions. The OPEN state may correspond to a high-impedance or a floating condition. Digital signal 102 may be used by motor control driver 200 for selecting an appropriate output gain. Digital signal 101 may at various moments carry a PWM signal or it may be "tri-stated" (i.e., in the OPEN or high-impedance state). The motor control driver 200 may also include a terminal to which a capacitor such as C1 may be coupled as described above.

FIG. 3 is a schematic diagram, in partial block form, of an exemplary embodiment of a PWM decoder 210. With reference to FIG. 3, the PWM decoder 210 may include a signal converter 211, a current source controller 212, a switch S1, a switch S2, a current source $I_{PWMH}$, a current source $I_{PWML}$, a signal adjusting resistor $R_{PWM}$, and input terminals 103, 104. The signal converter 211 may be coupled to receive the PWM digital signal 101 at terminal 104 and thereby to control switches S1 and S2 responsive to the possible states of digital signal 101. If digital signal 101 is in a LOW state, then the signal converter 211 may control the switch S1 to ON. If digital signal 101 is in a HIGH state then the signal converter 211 may control the switch S2 to ON. And if digital signal 101 is in an OPEN or high impedance state then the signal converter 211 may control both the switch S1 and the switch S2 to ON. In some embodiments, the signal converter 211 further includes an inverter. The present invention is not limited to the disclosed embodiments and persons of ordinary skill in the art will see that within the general scope of the invention it is possible to control the switch in other ways. For example, the circuit could operate to control S1 to ON in a HIGH state and the switch S2 to ON in a LOW state.

The current source controller 212 may be coupled to the GS pin 103 and may control an intensity of currents of the current sources $I_{PWMH}$ and $I_{PWML}$ according to a state of the digital signal 102 (OPEN, HIGH, or LOW) transmitted through the GS pin 103 from the DSP 100. That is, if digital signal 102 of a HIGH state is input through the GS pin 103 from the DSP 100, then the current source controller 212 may increase the currents of the current sources $I_{PWMH}$ and $I_{PWML}$. On the other hand, if the digital signal 102 from the DSP 100 that is input through the GS pin 103 is in a LOW state, the current source controller 212 may reduce the currents of the current sources $I_{PWMH}$ and $I_{PWML}$.

The switch S1 is coupled to the current source $I_{PWMH}$ on a first end and is also coupled to a first end of the switch S2 on a second end of switch S1. The switch S1 is controlled to ON or OFF states by a switching operation signal of the signal converter 211. The switch S2 is coupled to the switch S1 on a first end, and is coupled to the current source $I_{PWML}$ on a second end. The switch S2 is also controlled to ON or OFF states by a switching operation signal of the signal converter 211.

A first end of the current source $I_{PWMH}$ is coupled to a supply power Va and a second end of the current source $I_{PWMH}$ is coupled to the switch S1. If the switch S1 is ON, the capacitor C1 may tend to become charged. Also, a first end of the current source $I_{PWML}$ is coupled to the switch S2 and a second end of the current source $I_{PWML}$ is grounded. If the switch S2 is ON, the capacitor C1 may tend to become discharged.

A first end of the resistor $R_{PWM}$ is coupled to a reference voltage Vref and a second end of the resistor $R_{PWM}$ is coupled to a common node of the capacitor C1, the switch S1, and the switch S2. The resistor $R_{PWM}$ and reference voltage Vref act to limit the magnitude of a voltage Vc applied to the capacitor C1.

An exemplary operation of the motor control drive circuit 200 according to an embodiment of the present invention will now be described. The MOD 110 of the DSP 100 performs pulse width modulation of analog signals and then transmits the resulting signals 101 to the PWM decoder 210. In one particular exemplary operating condition, a duty ratio of the signals output by the MOD 110 might be 50%.

If the PWM signals 101 input from the MOD 110 are in an OPEN (high impedance) state, the PWM decoder 210 performs a control action such that the signal converter 211 controls both the switches S1 and S2 to ON. If the switches S1 and S2 are both controlled to ON, current flows from the external supply power Va through the current source $I_{PWMH}$, the switch S1, the switch S2, and the current source $I_{PWML}$, then to ground. There is no flow of current to charge or discharge the capacitor C1. Under this condition, the voltage Vc applied to the capacitor C1 is equal to the reference voltage Vref (which may have a value of 1.75 volts in one embodiment of the present invention). Under this condition, the voltage supplied to the PA (power amplifier) 220 becomes equal to the reference voltage Vref and the voltage Vc at the capacitor C1. The PA 220 determines a drive direction of the motor 300 according to a difference between the voltage output by the PWM decoder 210 and an operational reference voltage (not shown) of the PA 220.

If the PWM signals 101 input from the MOD 110 are in a LOW state, the PWM decoder 210 performs a control action such that the signal converter 211 controls the switch S1 to ON and the switch S2 to OFF. In this state, current flows from the external supply power Va through the current source $I_{PWMH}$, then through the switch S1, then into the capacitor C1. Thus, capacitor C1 begins to charge by the current source $I_{PWMH}$. Accordingly, a maximum value of the voltage Vc at the capacitor C1 results as shown in Equation 1 below.

$$Vc(max) = Vref + (I_{PWMH} \times R_{PWM}) \qquad \text{[Equation 1]}$$

Under these conditions, the voltage Vc at the capacitor C1 is limited by the resistor $R_{PWM}$.

On the other hand, if the PWM signals input 101 from the MOD 110 are in a HIGH state, then the PWM decoder 210 performs a control action such that the signal converter 211 controls the switch S1 to OFF and the switch S2 to ON. In this state, current flows from the capacitor C1 through the switch S2, then through the current source $I_{PWML}$, and to ground. The capacitor C1 is discharged by the current source $I_{PWML}$. Accordingly, a minimum value of the voltage Vc at the capacitor C1 results as shown in Equation 2 below.

$$Vc(min) = Vref - (I_{PWML} \times R_{PWM}) \qquad \text{[Equation 2]}$$

Under these conditions also, the voltage Vc at the capacitor C1 is limited by the resistor $R_{pwm}$.

Accordingly, if the duty ratio of the signal 101 generated by MOD 110 is 0%, the voltage Vc at the capacitor C1 becomes Vc(max) of Equation 1. Alternatively, if the duty ratio of the signal 101 generated by MOD 110 is 100%, the voltage Vc at the capacitor C1 becomes Vc(min) of Equation 2. Thus, under these boundary conditions, there is a monotonic relationship between the duty ratio of the signal 101 generated by MOD 110 and the voltage applied to the capacitor C1. It will be apparent to those of ordinary skill in the art that if the time constant of the combination of fixed resistor $R_{PWM}$ and C1 is chosen appropriately, then a linear relationship may be maintained, to within a sufficient accuracy, for intermediate duty cycle values also.

In some embodiments of the present invention the current source controller 212 responds to the gain select digital signals 102 from the DSP 100, and the magnitudes of the currents in current sources $I_{PWMH}$ and $I_{PWML}$ are selected by the operation of the current source controller 212. As a result, an overall voltage gain from digital signal 101 to PA output that is larger or smaller may be obtained responsive to signal 102.

FIG. 3a shows an alternative representation of the PWM decoder 210 of FIG. 3 being composed of signal converter 211 and amplifier controller 230. Amplifier controller 230 drives PA 220 and may include, essentially, the components of PWM decoder 210 excluding signal converter 211.

FIGS. 4a and 4b are graphs that show, respectively PA input voltages and motor voltages versus PWM signal duty cycle according to an embodiment of the invention.

Referring first to FIG. 4a, the solid line (labeled "GS Open") in the drawing shows input PWM signal duty cycle versus PA input voltage for the case where the input GS signal is in the OPEN (or high impedance) state. As shown, an input PWM signal duty cycle value of 50% corresponds to a PA input voltage of 1.75 volts or $V_{REF}$. Still referring to the solid line (labeled "GS Open"), if the duty cycle of the input PWM signal is increased to a value above 50% then PA input voltage is decreased since switch S2 is closed for longer periods than switch S1 and the capacitor C1 tends to become discharged by action of current source $I_{PWML}$. In this exemplary embodiment, a duty cycle of 100% with GS Open produces a PA input voltage of 0.75 volts, consistent with equation 2 and which is 1.0 volt below the value for a 50% duty cycle in this particular embodiment. Conversely, when the duty cycle is 0% and S1 is continuously closed and S2 is open, then the PA input voltage is 2.75 volts or 1.0 volt above the value for a duty cycle of 50%.

As described above, since the value of the voltage Vc at the capacitor C1 is input to the PA 220, and since it varies with changes in the duty cycle ratio of the PWM signal 101, the PA 220 output voltage and thus the drive voltage of the motor 300 may vary correspondingly.

With reference to FIG. 4b, the relationship between PWM signal 101 duty cycle and motor voltage is shown. The PA 220 may act as a differential amplifier to produce a motor voltage by applying a fixed gain to the difference between the voltage $V_C$ at the capacitor C1 and the reference voltage $V_{REF}$. As can be seen by inspecting FIG. 4b, a duty cycle of 50% corresponds to a zero motor drive voltage and the motor will come to rest. If the duty cycle increases, then a negative voltage may be applied to the motor 300 such that the motor 300 may be rotated in a counterclockwise direction. Conversely, if the duty ratio decreases, a positive voltage is applied to the motor 300 such that the motor 300 may be rotated in the clockwise direction. In an alternate embodiment, the rotational direction of the motor 300 may be controlled in a manner opposite to that described above (i.e., counterclockwise and clockwise rotation respectively by positive and negative voltages).

Referring back to FIG. 4a, the dashed line labeled "GS High" graphs the relationship between duty cycle and PA input voltage for the condition that the digital control signal 102 at the GS pin 103 is maintained at a HIGH state. Under the operating condition of GS signal 102 HIGH, the current source controller 212 causes the current sources $I_{PWMH}$ and $I_{PWML}$ to operate at increased currents that are greater than the currents for the digital control signal 102 OPEN operating condition described above. Increased currents in the current sources $I_{PWMH}$ and $I_{PWML}$ results in PA input voltages having an increased deviation from $V_{REF}$ as shown by the dashed line labeled "GS High". Since the differential input to the PA with respect to $V_{REF}$ is greater, then under this operating condition more aggressive voltages will be driven by the PA to the motor typically resulting in increased torque and/or acceleration.

Conversely, and still referring back to FIG. 4a, the dashed and dotted line labeled "GS Low" graphs the relationship between duty cycle and PA input voltage for the condition that the digital control signal 102 at the GS pin 103 is maintained at a LOW state. Under the operating condition of GS signal 102 LOW, the current source controller 212 causes the current sources $I_{PWMH}$ and $I_{PWML}$ to operate at decreased currents that are less than the currents for the digital control signal 102 OPEN operating condition described above. Decreased currents in the current sources $I_{PWMH}$ and $I_{PWML}$ results in PA input voltages having a lesser deviation from $V_{REF}$ as shown by the dashed and dotted line labeled "GS Low". Since the differential input to the PA with respect to $V_{REF}$ is lower, then under this operating condition less aggressive voltages (not shown) will be driven by the PA to the motor typically resulting in decreased torque and/or acceleration.

In the motor control drive circuit according to an embodiment of the present invention described above, motor rotation is controlled by the duty ratio of digital signals. This allows for the design of an independent digital signal processing device, and enables compatibility with a variety of different types of digital signal processing devices.

Further, by controlling the voltage applied to a power amplifier according to the state of a gain select signal transmitted from a DSP, motor rotation may be controlled without any particular external part replacement or adjustment to adapt to the gain of the PA under the prevailing operating conditions. With this capability of adjusting gain using digital signals, application to drive mechanisms for many varieties of devices such as optical disk read/write devices is possible, and real-time gain control is possible through fast access.

In addition, by varying the duty ratio of modulated signals without any amplifier replacement for adjusting gain, limits in the voltage that can be applied to a motor or actuator are lessened thus providing various advantages such as consistent operation over a wide range of power supply voltages.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A motor control drive circuit for controlling a motor comprising:

a signal converter adapted to generate a switching state signal responsive to a first received digital signal having undergone pulse width modulation in a digital signal control device; and a controller adapted to generate a voltage responsive to a duty cycle ratio of the switching state signal by adjusting by a variable gain in response to a second received digital signal from the digital signal control device, thereby controlling a rotation of the motor.

2. The motor control drive circuit of claim 1, wherein the signal converter is adapted to generate a first and a second switching states responsive to a high and a low state respectively in the first received digital signal;

the controller comprises a first switchable current source and a second switchable current source coupled at a common node, first switchable current source comprising a first switch and a first current source in series with the first switch, the second switchable current source comprising a second switch and a second current source in series with the second switch; and the signal converter controls the first and second switches to conduct in response to the first and second switching states respectively, and the first switchable current source supplies electric charge into the common node whenever the first switch is conducting and the second switchable current source sinks electric charge from the common node whenever the second switch is conducting.

3. The motor control drive circuit of claim 2, wherein the controller further comprises:

a current source controller for varying an intensity of the first and second current sources according to a signal state of the second received digital signal;

a capacitor coupled to the common node, the capacitor being alternately charged by the first current source and discharged by the second current source; and a signal adjusting resistor having a first end coupled to a reference voltage source and a second end coupled to the common node.

4. The motor control drive circuit of claim 1, wherein the controller determines a voltage output to the motor according to a duty cycle ratio of the first received digital signal, and further wherein the controller adjusts a voltage gain according to the second received digital signal.

5. The motor control drive circuit of claim 3, wherein the capacitor is charged to cause in the voltage applied to the motor to be a maximum whenever the circuit is in a first operating state having the duty cycle ratio of the first received digital signal selected from a list consisting of 100% and 0%, and wherein the capacitor is discharged to cause in the voltage applied to the motor to be a minimum whenever the circuit is in a second operating state having the duty cycle ratio of the first received digital signal selected from a list consisting of 100% and 0% and wherein the first and second operating states are mutually distinct.

6. The motor control drive circuit of claim 2, wherein the controller controls the first and second switches to a condition selected from a list consisting of both conducting and both non-conducting, in response to a high impedance state of the first received digital signal, thereby maintaining the voltage at the common node at a reference voltage.

7. A motor control drive circuit for driving a motor comprising:

a digital signal controller outputting a first digital signal having pulse undergone width modulation and further having a duty cycle ratio;

a pulse width modulation decoder receiving the first digital signal and a second digital signal, the decoder varying a gain of a drive voltage in response to the second digital signal, the drive voltage being applied to the motor, the pulse width modulation decoder further controlling a rotation of the motor according to the duty cycle ratio, wherein the pulse width modulation decoder comprises:

a signal converter receiving the first digital signal and generating a switching state signal based on the first digital signal, wherein the signal converter is adapted to receive the first digital signal, and adapted to generate the switching state signal having a first and a second switching state according to whether first digital signal is in a high or a low state respectively;

a controller receiving the switching state signal and the second digital signal, and varying a voltage gain to control the rotation of the motor, wherein the controller comprises a first switchable current source and a second switchable current source coupled at a common node, first switchable current source comprising a first switch and a first current source in series with the first switch, the second switchable current source comprising a second switch and a second current source in series with the second switch; and wherein the signal converter controls the first and second switches to conduct in response to the first and second switching states respectively, the first switchable current source supplies electric charge into the common node whenever the first switch is conducting and the second switchable current source sinks electric charge from the common node whenever the second switch is conducting;

a current source controller for varying an intensity of the first current source and of the second current source according to the second digital signal; and a signal adjusting resistor, one end of the signal adjusting resistor coupled to an external reference voltage source and a second end of the signal adjusting resistor coupled to the common node, the signal adjusting resistor adjusting an intensity of a voltage applied to the capacitor.

8. A motor control drive circuit for driving a motor comprising:

a digital signal controller outputting a first digital signal having pulse undergone width modulation and further having a duty cycle ratio; and a pulse width modulation decoder receiving the first digital signal and a second digital signal, the decoder varying a gain of a drive voltage in response to the second digital signal, the drive voltage being applied to the motor, the pulse width modulation decoder further controlling a rotation of the motor according to the duty cycle ratio, wherein the pulse width modulation decoder comprises:

a signal converter receiving the first digital signal and generating a switching state signal based on the first digital signal; and a controller receiving the switching state signal and the second digital signal, and varying a voltage gain to control the rotation of the motor;

wherein the pulse width modulation decoder controls a first switch and a second switch to a condition selected from a list consisting of both conducting and both non-conducting in response to a high impedance state of the first received digital signal, thereby maintaining the voltage at the common node a reference voltage.

9. A motor control drive circuit comprising means for generating a digital signal having pulse width modulation and further having a duty cycle ratio;

means for generating a DC level having a monotonic relationship to the duty cycle ratio;

means for amplifying the DC level; and means for adjusting a gain of the means for amplifying in response to a second digital signal.

10. The motor control drive circuit of claim 9 wherein the monotonic relationship is a linear relationship.

* * * * *